UNITED STATES PATENT OFFICE.

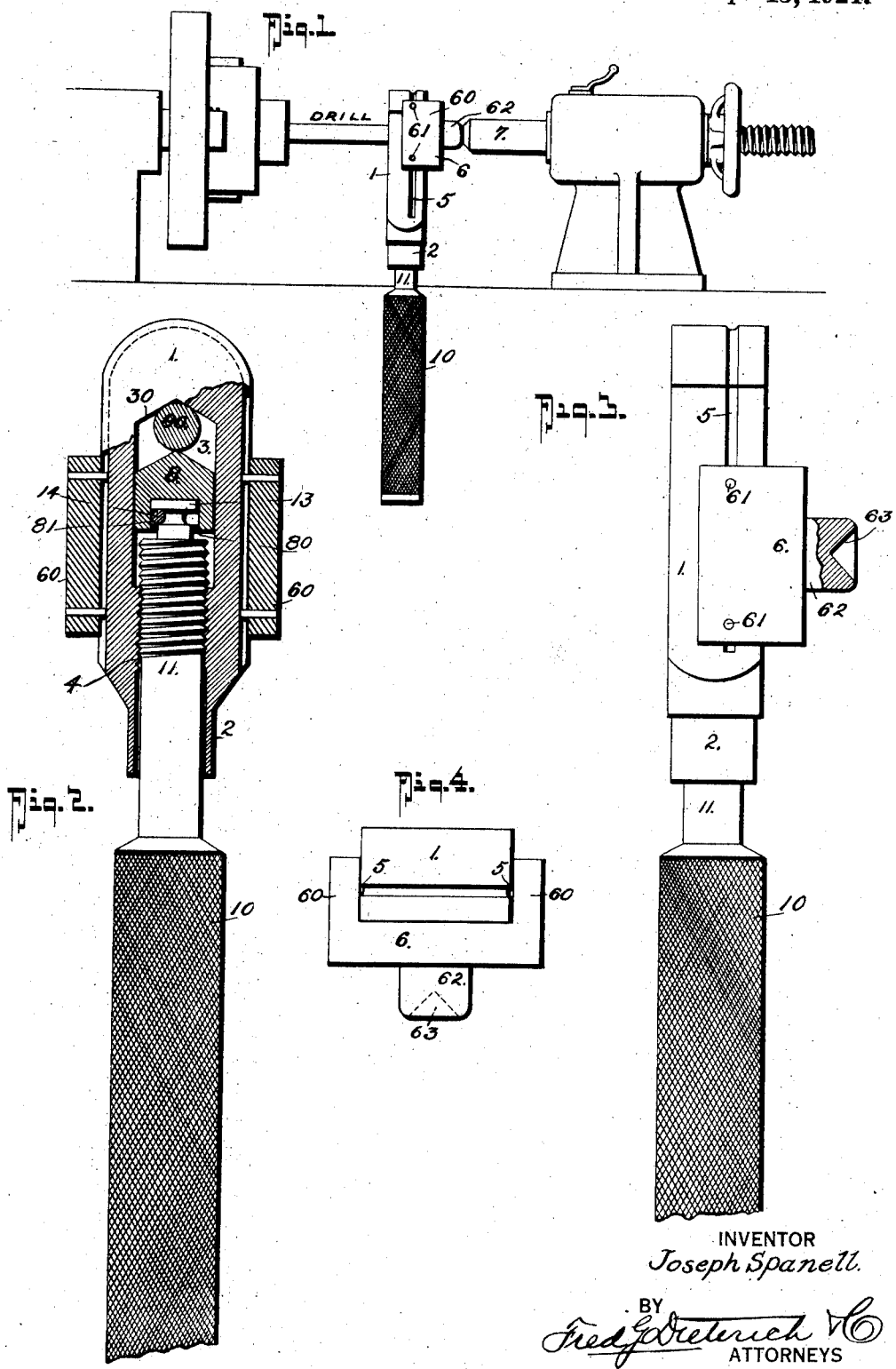

JOSEPH SPANELL, OF HAZLETON, PENNSYLVANIA.

DRILL-HOLDER.

1,390,731.  Specification of Letters Patent.  Patented Sept. 13, 1921.

Application filed December 18, 1920. Serial No. 431,595.

*To all whom it may concern:*

Be it known that I, JOSEPH SPANELL, a citizen of the United States, residing at Hazleton, in the county of Luzerne and State of Pennsylvania, have invented certain new and useful Improvements in Drill-Holders, of which the following is a specification.

My invention is an improved appliance for holding drills when sustained for working on any kind of metal or wood in which the holes are to be drilled and primarily my invention has for its purpose to provide an appliance of the character stated, of a comparatively simple and economical construction in which the parts are especially designed for quick adjustment and for holding different sizes of drills.

My invention embodies a drill holding appliance that includes the peculiar features of construction and novel arrangement of parts, stated in the following detailed description, as specifically pointed out in the appended claims and as illustrated in the accompanying drawings, in which:

Figure 1 is a side elevation of my drill holding appliance, so much of a lathe mechanism being shown as is necessary to illustrate a practical application of my said invention.

Fig. 2 is a front elevation of the appliance, parts being in vertical section.

Fig. 3 is a side elevation, parts being in section.

Fig. 4 is a top plan view of the appliance.

In the practical development of my invention, the same embodies a head stock 1 of a substantially elongated shape in face view, the lower end of which terminates in a hub-like extension 2.

The head stock 1 is formed with a vertically elongated slot 3, the upper end of which terminates in a Λ shape crown 30, while the lower end is squared across and merges with an internally threaded bore 4 that extends through the bottom portion of the head stock and the hub-like extension 2, as is clearly shown in Fig. 2.

In each of its opposite sides, the head stock 1 has a vertically extended groove 5 and the said two oppositely disposed grooves 5—5 form the means for vertically guiding the head 1 on a chuck member 6 that includes a front plate and angled portions 60—60, each of the latter having a pair (an upper and a lower) of guide pins 61—61 which, when the several parts are operatively connected, fit and ride within the aforesaid guide grooves 5—5.

The chuck member is also provided with a centering hub 62 that projects at right angles to the front plate or body 6 and has the usual tapering socket 63 for engaging a correspondingly formed end of the feed shaft 7 of the lathe, as is clearly indicated in Fig. 1.

8 designates a clamp block also provided with a Λ shaped bearing end for firmly bighting the shank 90 of the drill, when the latter is forced up into the Λ shaped crown 30 in the adjusting slot 3.

For conveniently and expeditiously adjusting the clamping block 8, a handle 10 is provided which includes a threaded shank 11 that screws into the threaded bore 4 of the head stock 1 and whose upper end is reduced and formed with a head 13 which extends up into and swivelly engages a socket 80 in the clamp block 8 and in which it is secured by a cross pin 14 that passes through a transverse aperture 81 in the clamping block and engages the neck or groove head 13, as shown.

From the foregoing description taken in connection with the accompanying drawings, the complete construction, the manner in which my appliance is used and the advantages thereof will be readily apparent to those familiar with the implement or drill holding means of the general type to which my invention relates.

It is obvious from the drawings that drill shanks of different diameters may be readily fitted within the head stock 1 and clamped therein by a proper adjustment of the handle 10 that shifts the clamping block 8, up or down, as is necessary and when once adjusted, the drill can be firmly held and may be readily supported in proper horizontal alinement with the lathe feed shaft.

What I claim is:

1. In an appliance of the character described, a chuck, a head stock engaging the chuck the latter being slidably movable on the said stock and means for holding a drill in the head stock, the said means including clamping blocks movable in the head stock and a handle having a screw feed connection with the head stock and connected with the clamping block therein.

2. A drill holding appliance of the character stated comprising a head stock having a vertically elongated slot, a chuck adapted for engaging the lathe feed shaft, said head stock and chuck having a relatively sliding engagement, means carried on the head stock for clamping a drill shank thereon, the said means including a clamping block slidable within the slotway of the head stock, a handle for effecting slidable adjustment of the head stock with respect to the lathe engaging chuck, the said handle and head stock having a screw feed connection, the end of the handle being projected into the slot of the head stock and having a swivel connection with the clamping block.

JOSEPH SPANELL.